United States Patent Office 3,008,996
Patented Nov. 14, 1961

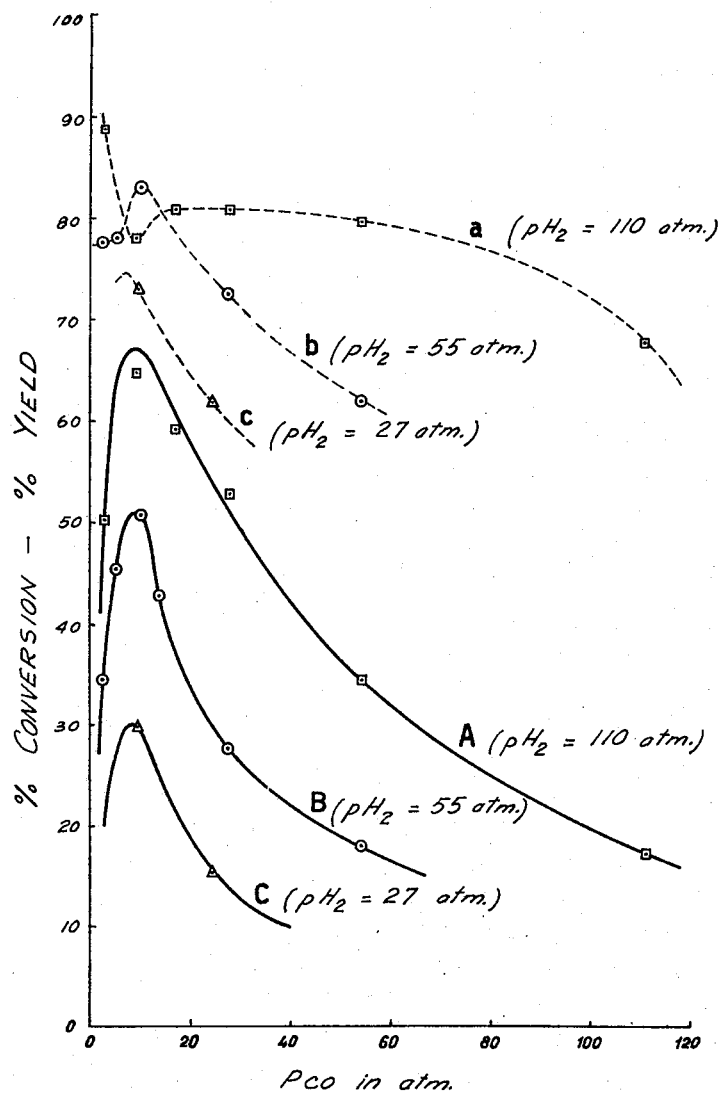

3,008,996
PROCESS FOR PRODUCING ALDEHYDES
Giulio Natta, Milan, Raffaele Ercoli, Monza, and Salvatore Castellano, Milan, Italy, assignors to Montecatini Societa Generale per l'Industria Mineraria e Chimica, a corporation of Italy
Filed Apr. 1, 1955, Ser. No. 498,693
Claims priority, application Italy Apr. 10, 1954
9 Claims. (Cl. 260—598)

The present invention relates to the synthesis of oxygen-containing compounds, particularly aldehydes, from olefinic compounds, carbon monoxide and hydrogen.

In this synthesis, known as "hydroformylation" or "oxo-synthesis" in short, olefinic compounds are reacted with carbon monoxide and hydrogen in the presence of metal catalysts, capable of forming carbonylic compounds. Cobalt catalysts in particular are capable of forming aldehydes and alcohols having one carbon atom more than the olefinic starting material. The reaction proceeds according to the following scheme:

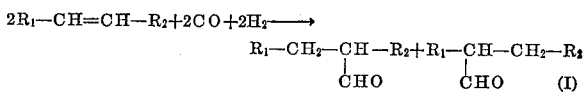

The present invention relates to an improvement over the known processes of this type which, based on criteria that heretofore have escaped the attention of workers in this field, tend to result in a much more favorable operation. Thus, all other conditions being equal, the herein-disclosed improvement produces, in the first place, a substantial increase in the conversion rate of olefin to aldehyde per time unit at equal yield (the term "conversion rate" meaning here the molar ratio between the desired product obtained and the raw material used). Secondly, the disclosure permits the adoption of much milder operating conditions than heretofore employed.

The process of this invention comprises the production of oxygen-containing compounds, particularly aldehydes, from various olefinic compounds, viz. aliphatic olefines, mixtures of aliphatic olefines, cyclic olefines and also aryl olefines; by reacting these compounds with carbon monoxide and hydrogen at pressures higher than atmospheric pressures and at ordinary or elevated temperatures, particularly at temperatures between 50 and 130° C., whereby the reaction is carried out in a homogeneous phase system and in the presence of soluble cobalt derivatives as catalysts, capable of forming carbonylic compounds, particularly in the presence of dicobalt octacarbonyl. The essential feature of the herein-disclosed process is that it is conducted at a comparatively low partial pressure of carbon monoxide, preferably between 5 and 35 atm., and with a molar ratio R between $H_2$ and $CO$ wherein R is higher than 2, preferably higher than 4, and lower than 60.

We have found that, in syntheses of this type, the conversion rate depends essentially upon the partial pressure of carbon monoxide and upon the molar ratio $H_2/CO$. More specifically, we have discovered that low values of the partial pressure of carbon monoxide produce a more favorable conversion rate than high values. Another essential requirement is that the partial pressure of hydrogen must be considerably higher than that of carbon monoxide; an upper limitation being dictated only by the facts that, at R values in excess of 50 to 60, the economy of the processes decreases while, at a still further increase in R, the yields become lower. Moreover, according to this invention, the pressure equivalents are not chosen at random, but the partial pressure of hydrogen ($pH_2$) and, therefore, the total pressure employed in the process are based on the partial pressure of carbon monoxide ($p_{CO}$) and on the value selected for the R ratio.

In other words, it has been found that, when operating at the temperature conditions as indicated, in a homogeneous system and in the presence of a soluble cobalt-containing catalyst, while retaining previously-used hydrogen pressures, the conversion to aldehydes per time unit can be greatly improved if, instead of employing a high partial pressure of carbon monoxide, a previously-determined carbon monoxide partial pressure of only 5 to 35 atm. is employed. We have observed that for each temperature a carbon monoxide partial pressure exists at which the conversion to aldehydes per time unit is at a maximum and at which the yields are generally better than those obtained under hitherto used operating conditions. As may be seen from the following examples and from the accompanying graph, when operating at 110° C., the conversion reaches a maximum at a carbon monoxide partial pressure of 7 to 10 atm. Moreover, the maximum shifts toward higher CO pressures if the operation temperature exceeds 130° C.

If a higher partial pressure of carbon monoxide is adopted than that corresponding to the optimum value, the reaction is the more slowed down the greater the difference between the adopted pressure and the optimum pressure. Consequently, after identical operation periods, higher amounts of unreacted olefine are found and sometimes lower yields are obtained.

Furthermore, it has been observed that an increase in the hydrogen partial pressure tends to considerably increase the conversion to aldehydes during a time unit, particularly at carbon monoxide partial pressures less than 30 atm. Combining these two effects results in a substantial technical improvement. It is possible to conduct the reaction at relatively moderate temperatures and pressures with a greatly improved conversion rate, provided the carbon monoxide rate is held within the above-defined limits and the $H_2/CO$ ratio is adjusted to from 5:1 to 50:1.

The difference of the effects which we observed upon an increase in the relative partial pressure of hydrogen and carbon monoxide, respectively, is the more surprising since it seems to be contradictory to the general laws of the kinetics of chemical reactions, the speed of which normally increases in cases of gas reactions resulting in a volume contraction, if the partial pressure of one of the reacting gases is increased. As yet, we have not been able to find a convincing theoretical interpretation of this unexpected phenomenon. One possible explanation is based on the assumption that the entire reaction takes place in successive steps, with the intermediary formation of a cobalt carbonyl complex in which olefine replaces part of the carbon monoxide bound to the cobalt. Excessive CO pressure prevents the formation of the cobalt-olefine complex, whereas too low a CO pressure does not allow the cobalt-carbon monoxide complex to form again. This would explain why the reaction proceeds at highest speed at a well-defined value of CO pressure.

The entire reaction may be then represented as a series of successive steps according to the following scheme:

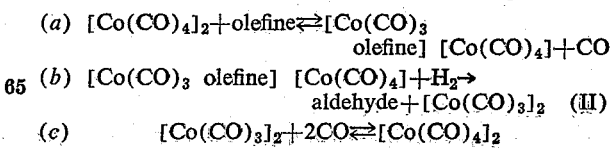

For the sake of simplicity, the reaction has been illustrated as starting with only one octacarbonyl molecule, although in the formula most commonly accepted for cobalt carbonyl, $[Co(CO)_4]_n$, the value of 4 is attributed to $n$.

Assuming that the equilibriums (a) and (c) are established very rapidly as compared with the rate of the reaction (b), it is obvious that the reaction rate is proportional to the concentration of the cobalt-olefine complex and to the hydrogen pressure. If the equilibrium (a) is shifted substantially to the left, as will be the case when attempting to isolate the complex which, however, is extremely difficult, the concentration of the latter is proportional to the olefine concentration. This is confirmed by the fact that hydroformylation is a reaction of the first order with respect to the olefine.

All other conditions being equal, the concentration of the complex is determined not only by the equilibrium (a) but, in addition, also by the equilibrium (c), and the concentration is highest at a well-defined carbon monoxide partial pressure, in such a manner that a decrease of the CO pressure promotes an increase of the concentration of the complex in equilibruim (a), but at the same time causes a decrease of the cobalt octacarbonyl concentration is equilibrium with tricarbonyl according to (c). In other words, the CO pressure exerts upon the concentration of the complex two opposing and quantitatively non-equivalent influences, causing an increase in the cobat octacarbonyl concentration according to equilibrium (c) with the square of the CO pressure, whereas the concentration of the complex according to equilibrium (a) decreases proportionally to the increase of CO pressure. It follows that the values of the CO pressure at which, all other conditions being equal, the maximum conversion per time unit is obtained, depend almost exclusively upon the value of the constant K which controls the equilibrium of (c):

$$K = \frac{C_{tricarbonyl} \cdot p_{CO}^2 \cdot s^2}{C_{octacarbonyl}} \qquad (III)$$

The value of K cannot be deduced from the data found in the literature, because there have been no prior studies of equilibrium conditions between carbon monoxide, cobalt octacarbonyl and cobalt tricarbonyl in diluted solution. From a joint study by one of these applicants with another of the equilibrium in question in the absence of solvents, which will be shortly published in Rend. Accad. Naz. Lincei, it appears that the reaction (c) is exothermic from left to right and that a $\Delta H$ value of 17,000 calories must be attributed thereto. We can, therefore, establish that the value of K, whichever it may be, increases about three times for a temperature increase of 20° C.

On the other hand, by means of scheme (II), approximate correlation can be deduced of the ratio U between olefine consumed and olefine employed. This ratio U is sufficiently representative of the conversion to aldehydes when considered together with the variables which influence the reaction rate. An approximate value of K for the temperature of 110° C. can, therefore, be obtained on the basis of experimental data. Thus, if:

A is a constant depending upon the nature of the olefine, the temperature and the quantity of octacarbonyl used;
$t$ indicates the duration of the reaction in minutes;
$e = 2.7182 \ldots$ (base of the natural logarithms);

it follows that, based on scheme (II):

$$U = 1 - e^{-At\frac{p_{CO} \cdot p_{H_2}}{K + p_{CO}^2}} \qquad (IV)$$

On the basis of fourteen experiments with cyclohexene, seven of which are described hereunder in Examples 3 to 9, an average value of 59 has been calculated for K and a value of $4.05 \times 10^{-3}$ for A.

The close agreement of U values calculated for $K = 59$ and $A = 4.05 \times 10^{-3}$ with the experimental values appears from Table 1.

Table 1

| Example No. | U, calculated | U, experimental |
|---|---|---|
| 3 | 61.4 | 61.8 |
| 4 | 24.1 | 27.4 |
| 5 | 23.7 | 28.5 |
| 6 | 41.8 | 45.3 |
| 7 | 36.3 | 42.4 |
| 8 | 61.7 | 60.9 |
| 9 | 85.2 | 83.5 |

The agreement is less satisfactory, but always closely indicative if, based on the K value calculated in connection with the above experiments and on an A value of $2.00 \times 10^{-3}$, the theoretical values of U are compared with the experimental values obtained when using 2-ethyl-hexene-1 as the olefine.

Since in the approximate relation (IV) the constant A, which depends upon the nature of the olefinic compound, is involved only as multiplying factor, a further indication is provided that the partial pressure of carbon monoxide, at which the maximum conversion is obtained, depends, all other conditions being equal, substantially upon the equilibrium between cobalt octacarbonyl and tricarbonyl. In particular, the optimum pressure may be calculated within reasonable error limits by means of the formula $P_{CO} = \sqrt{K}$, inasmuch as (IV) allows a maximum for said value of the carbon monoxide pressure.

Knowing from experiments the approximate value of K at 110° C., the values of K at various temperatures can be obtained on the basis of $\Delta H$, and from these values it is possible to arrive at an indication of the most favorable $P_{CO}$ value for a given temperature. For example, since the value of K at 110° C. ranges from 50 to 100, it can be deduced that the optimum pressure of carbon monoxide at 130° C. will be between 12 to 20 atm. Similarly, for temperatures between 70 and 110° C., the optimum pressure of carbon monoxide will range from 2 to 7 atm.

From a practical point of view, the optimum carbon monoxide pressure range for the aldehyde synthesis must be considered as extending over somewhat larger limits, since it must be kept in mind that in industrial practice it is not always possible to attain the best contact between liquid and gas. However, it must not exceed 30–35 atm. because beyond this limit the conversion rate per time unit is severely reduced.

As far as the upper temperature limit of the process according to the present invention is concerned, the value set forth is justified by the fact that, at temperatures above about 130° C., a larger formation of alcohols takes place, with a consequent decrease of the yield in aldehydes. Since the phenomenon, on which the present invention is based, applies to various types of olefines and, more particularly, to olefines with and without a terminal double bond, or having the double bond between carbon atoms one of which is partly substituted and the other unsubstituted (propylene), or one of which is unsubstituted and the other one completely substituted (2-ethyl-hexene-1), or wherein both carbons are partly substituted (cyclohexene), as indicated by the foregoing theoretical discussion, the invention is applicable to all the olefines which lend themselves to hydroformylation under known conditions, regardless of the type of the olefinic compound employed.

The advantages of the present invention appear particularly evident in view of the fact that even at very low total pressures, such as 36 atm. (Example 7), it is possible to obtain aldehydes at conversion rates which are more than double the conversion rate obtainable within the same time and under the same conditions at a water gas pressure of 220 atm. (Example 4). On the other hand, by comparing Examples 5, 8 and 9, it becomes evident that, upon a suitable choice of the $H_2/CO$ ratio, the synthesis can be carried out at identical total pressures with conversions from 2.4 to four times higher than those obtainable during the same period of time by using water gas; and this under very low partial pressures of carbon monoxide. Another advantage of the present invention resides in the fact that, since favorable reaction rates are obtained at lower temperatures than those commonly employed in practice, the conversion of the aldehyde compounds to alcohols is substantially reduced, notwithstanding any high hydrogen pressure. Consequently, the yield is usually better.

The process of this invention can be carried out in a continuous or discontinuous manner. In the case of a discontinuous process, the catalyst and the olefine, dissolved in an inert solvent or without solvent, and a mixture of carbon monoxide and hydrogen, at a ratio fixed so that the partial pressure of carbon monoxide does not exceed the desired value, are introduced into the reactor, fitted with stirrer. The reactants are heated until the desired temperature is reached. That part of gas which is consumed during the reaction is replaced with a $CO-H_2$ mixture of a composition chosen so as to assure that the gas ratio inside the reactor is maintained within the desired range. It should be pointed out that, generally, decreases of the partial pressure of carbon monoxide down to values of 2 to 5 atm., depending upon the temperature, are not substantially harmful, provided the partial pressure of hydrogen remains sufficiently high.

The reaction can be carried out in a continuous manner by circulating through the reactor a gas mixture having the required high, predetermined $H_2/CO$ ratio and continuously reestablishing the composition of the gaseous phase by adding a $CO-H_2$ mixture of such a composition as to counteract the reduction, due to the reaction, of the partial pressure of carbon monoxide below the desired value.

In order to further illustrate the invention, the following examples are presented: synthesis of hexahydrobenzoic aldehyde from cyclohexene (examples from 1 to 9, Tables 1a and 1b, appended graph); synthesis of aldehydes $C_9$ from 2-ethyl-hexene-1 (Examples 10, 11 and 12, Table 2); and synthesis of butyric aldehydes from propylene (Examples from 13 to 17).

The choice of the olefines for the examples has been made so as to demonstrate the general applicability of the process to gaseous and liquid, cyclic and aliphatic, straight chain and branched chain olefines. Examples 2, 4, 5, 6, 8, 12, 14, 16 and 17 reflect operating conditions wholly or partially outside the range or boundary conditions, and are given primarily for purposes of comparison.

EXAMPLE 1

1.2 g. of dicobalt octacarbonyl, 43 g. of an n-heptane solution of cyclohexene ($C_6H_{10}$, 11.6 g.), 20 atm. of CO and 100 atm. of $H_2$ are introduced into a shaking autoclave of 435 cc. capacity. The autoclave is heated quickly to 115° C. and stirring is commenced. Within thirty-five minutes of stirring at 114–115° C., the total pressure drops from a maximum of 143 atm. to 126 atm. After rapid cooling, the gases are removed and 46.5 g. of a liquid are recovered, the analysis of which shows an aldehyde content of 10.3 g. (calculated as hexahydrobenzaldehyde). The conversion ratio is 65%.

EXAMPLE 2

The experiment of Example 1 is repeated, changing only the composition and total pressure of the gas so that at room temperature 105 atm. of CO and 55 atm. of $H_2$ are introduced. After thirty-five minutes of stirring at 115° C., the pressure drops from a maximum of 206 atm. to 201 atm. 43 g. of liquid containing 2.5 g. of hexahydrobenzaldehyde are recovered, indicating a conversion rate of 14.4%, based on the cyclohexene introduced.

EXAMPLE 3

1.4 g. of dicobalt octacarbonyl and 100 g. of a toluene solution of cyclohexene (34% cyclohexene) are introduced into a shaking autoclave of 435 cc. capacity; after heating to 110° C. under a hydrogen pressure of 45 atm., 20 atm. of a 1:1 carbon monoxide-hydrogen mixture are introduced into the autoclave. The total gas pressure of 65 atm. (55 atm. of $H_2$ and 10 atm. of CO) is maintained constant (±1 atm.) by continuous introduction of 1:1 $CO-H_2$ mixture. After sixty-eight minutes, the reaction is stopped by rapid cooling of the autoclave. The liquid portion of the reaction mixture contains 22.9 g. of hexahydrobenzaldehyde. 13 g. of cyclohexene are recovered. The conversion rate based on cyclohexene is 49%.

EXAMPLE 4

The experiment described in Example 3 is repeated under the same operating conditions, but under a carbon monoxide and hydrogen pressure of 110 atm. (55 atm. each). 8.0 g. of aldehyde are obtained and 24.7 g. of cyclohexene are recovered. The conversion rate based on cyclohexene is 17.4%.

EXAMPLE 5

The experiment of Example 3 is repeated under the same operating conditions and with the same partial hydrogen pressure (55 atm.), but under a partial carbon monoxide pressure of 55 atm. 8.4 g. of aldehydes are obtained and 24.3 g. of cyclohexenes are recovered. The conversion rate based on cyclohexene is 18.1%.

EXAMPLE 6

The experiment described in Example 3 is repeated under the same operating conditions, except that a partial carbon monoxide pressure of 55 atm. and a partial hydrogen pressure of 110 atm. are employed. 15.5 g. of aldehyde are obtained and 18.6 g. of cyclohexene are recovered. The conversion rate based on cyclohexene is 33.4%.

EXAMPLE 7

The experiment described in Example 3 is repeated under the same operating conditions but under a constant pressure of 26 atm. of hydrogen and 10 atm. of carbon monoxide. 13.5 g. of aldehyde are obtained and 19.6 g. of cyclohexene are recovered. The conversion rate based on cyclohexene is 39%.

EXAMPLE 8

The experiment described in Example 3 is repeated under the same operating conditions, except that the process is carried out under a partial carbon monoxide pressure from 2 to 3 atm., whereas the partial hydrogen pressure is maintained at 110 atm. (±1 atm.). 21 g. of aldehyde are obtained and 13.3 g. of cyclohexene are recovered. The conversion rate based on cyclohexene is 45.0%.

EXAMPLE 9

The experiment described in Example 3 is repeated under the same operating conditions, except that the partial hydrogen and carbon monoxide pressures are maintained at about 110 atm. $H_2$ and 10 atm. CO, respectively (ratio $H_2/CO = 11$), throughout the experiment. 29.4 g. of aldehyde and 5.6 of cyclohexene are recovered. The conversion rate based on cyclohexene is 63%.

EXAMPLE 10

1.4 g. of dicobalt octacarbonyl and 94.7 g. of a toluene solution of 2-ethyl-hexene-1 ($C_8H_{16}$, 45.5 g.), are introduced into a shaking autoclave of 435 cc. capacity. The autoclave is heated to 110° C. under a hydrogen pressure of 45 atm. Upon reaching this temperature, 20 atm. of 1:1 carbon-monoxide-hydrogen mixture are introduced so that a pressure of 10 atm. CO and 55 atm. $H_2$ is maintained in the autoclave. The total pressure is kept constant throughout the experiment by continuously feeding a 1:1 $CO-H_2$ mixture. After sixty-eight minutes, the autoclave is rapidly cooled. The analysis of the reaction product shows 13.5 g. of aldehydes (calculated as aldehydes $C_9$). The conversion rate based on the olefine is 25.2%. 31 g. of ethylhexene are recovered.

EXAMPLE 11

The experiment described in Example 10 is repeated under the same operating conditions but under constant hydrogen and carbon monoxide pressures of 110 atm. $H_2$ and 10 atm. CO, respectively. The analysis shows an aldehyde $C_9$ content of 19.1 g. The conversion rate based on the olefine is 33%. 24.2 g. ethylhexene are recovered.

EXAMPLE 12

The experiment described in Example 10 is repeated under the same operating conditions but under a constant pressure of 55 atm. hydrogen and 55 atm. carbon monoxide. The analysis of the reaction product shows an aldehyde $C_9$ content of 9.0 g. The conversion rate based on olefine is 15.7%. Ethylhexene recovered is 37.1 g.

EXAMPLE 13

80 g. of benzene, 12.5 g. of propylene, 1.5 g. of dicobalt octacarbonyl and hydrogen of 170 atm. pressure at 20° C. are introduced into a shaking autoclave of 435 cc. capacity. After heating of the autoclave to 82° C., the pressure is of 200 atm. At this point, 20 atm. of 1:1 $CO-H_2$ mixture are introduced into the autoclave, so that the latter contains a $CO-H_2$ mixture at a ratio of about 20:1. The reaction starts instantaneously and the pressure is maintained at 220 atm. (±2 atm.), by feeding fresh gas mixture so that the ratio between hydrogen and carbon monoxide remains near the pre-established ratio. The reaction is stopped after three hours by quickly cooling the autoclave. The analysis of the reaction product shows the presence of 15.8 g. of aldehydes (calculated as aldehydes $C_4$), with a conversion rate of 74%, based on propylene.

EXAMPLE 14

60 g. of benzene, 36 g. of propylene, 1.5 g. of dicobalt octacarbonyl and a 1:1 $CO-H_2$ mixture of 300 atm. pressure at 20° C. are introduced in the autoclave used in Example 12. After heating to 82° C., the pressure rises to 403 atm. Stirring is continued for three hours at a temperature of 80 to 82° C. The reaction is stopped by quickly cooling the autoclave and the gases are removed. The analysis of the liquid product obtained shows the presence of 13.4 g. of aldehydes (calculated as aldehydes $C_4$). The conversion rate based on propylene introduced is 21.6%.

EXAMPLE 15

2.8 g. of dicobalt octacarbonyl, 70 g. of toluene, and 25 g. of propylene are introduced into a shaking autoclave of 435 cc. capacity. Stirring is commenced and the autoclave is charged with 4 atm. of a 1:1 $CO-H_2$ mixture. After heating to 74° C., 5 atm. of carbon monoxide and 29 atm. of hydrogen are introduced. A total pressure of 49 atm. is substantially maintained for one hundred fifty minutes by compensating for the pressure drop with gas containing CO and $H_2$ in a ratio of 1:1, while the temperature is maintained between 74 and 75° C. After one hundred fifty minutes of heating, the autoclave is cooled quickly to room temperature, the gases are removed and 88.0 g. of crude liquid are recovered (weight increase 15.2 g.), the analysis of which shows an aldehyde $C_4$ content of 11.2 g. The conversion rate is 26.2%, the yield by weight 73.5%.

EXAMPLE 16

2.8 g. of dicobalt octacarbonyl, 70 g. of toluene and 26 g. of propylene are introduced into the autoclave of Example 14. Stirring is commenced and the autoclave is charged with 4 atm. of a 1:1 $CO-H_2$ mixture. After heating to 73° C., 33 atm. of hydrogen are introduced. A total pressure of 49 atm. is substantially maintained, by means of the technique described in Example 14. During the reaction, the temperature is kept between 73 and 74° C. After one hundred fifty minutes, the autoclave is cooled quickly to room temperature, the gases are removed, and 81 g. of crude liquid are recovered (weight increase 8.2 g.). The analysis of the reaction product shows an aldehyde $C_4$ content of 6.7 g. The conversion rate is 15%, the yield by weight 81.8%.

EXAMPLE 17

2.8 g. of dicobalt octacarbonyl, 70 g. of toluene and 28 g. of propylene are introduced into the autoclave of Example 14. Stirring is commenced and the autoclave is charged with 4 atm. of a 1:1 $CO-H_2$ mixture. After heating to 75° C., 52 atm. of CO and 103 atm. of $H_2$ are introduced. The total pressure is 168 atm. The reaction is carried out as previously described (Example 14). After an operation of one hundred fifty minutes, conducted as described in Example 14, 80.0 g. of crude liquid are obtained (weight increase 7.2 g.), the analysis of which shows an aldehyde $C_4$ content of 5.8 g. The conversion rate is 12%, the yield by weight 75%.

A comparison between Examples 1 and 2 shows clearly the influence of the parameters set forth in the present disclosure. The picture is made more complete by Examples 3 to 9, relating to tests the results of which are shown in the appended graph. The graph illustrates the variation of the conversion rate and aldehyde yield as a function of the partial pressure of carbon monoxide and refers to discontinuous experiments with cyclohexene, carried out at 110° C., at constant partial hydrogen pressure, identical catalyst concentration and identical reaction time (sixty-eight minutes).

The partial pressures of carbon monoxide $p_{CO}$ are indicated in atm. on the abscissa while, referring to the ordinate, the percent conversion rates of cyclohexene to aldehyde are indicated by solid line curves (A; B; C) and the corresponding yields by dotted line curves (a; b; c). The curves A and a refer to experiments carried out at $pH_2=110$ atm.; the curves B and b at $pH_2=55$ atm.; and the curves C and c at $pH_2=27$ atm.

Examples 10 and 11, relating at 2-ethyl-hexene-1 as starting material, show the influence on the conversion of variation of R for $p_{CO}=10$ within the optimum range according to the present invention, whereas Example 12 shows that the results obtainable when operating under conventional conditions with the same olefine are considerably lower than by following the present invention. Examples 13 and 14 furnish a comparison between an operation, based on propylene, under conventional conditions, and an operation under conditions according to the present invention.

Referring to Examples 15, 16 and 17, as can be seen, particularly from Example 16 wherein $p_{CO}=2.5$ atm., $pH_2=35$ atm., R=14, conversion rates of 15% and yields of about 82% are obtainable after a reaction time of one hundred fifty minutes at a temperature as low as 73.5° C. In the absence of this high R ratio, the conversion rate would be so low that the reaction would be considered infeasible. From Example 15 can be seen, on the other hand, that, at $p_{CO}=7$ atm. (which is well above the lower limit), $pH_2=32$ atm. (lower than in Example 16), and R=4.5 (which is just above the applicable lower limit), after a reaction time of one hundred fifty minutes at a temperature as low at 74.5° C., the conversion rate increases to 26% while the yield remains 73.5%. Finally, Example 17, wherein the operation is carried out at $p_{CO}=54$ atm.; $pH_2=105$ atm.; R=2 (which is the highest limit for $p_{CO}$ and the lowest limit for R), shows that after heating for one hundred fifty minutes to a temperature of 75° C., the conversion rate is only 12%. Thus, even at a $CO+H_2$ pressure of 159 atm. and a total pressure $p_t$ of 168 atm., the reaction takes place at such a slow rate that it is nearly impracticable. The conclusion is that, at R ratios of this order, at lower pressures than the foregoing, the conversion rate will be so low as to make the reaction practically useless.

The principal data of the examples are summarized in the following tables.

*Table 1a*

[Olefine: cyclohexene; temperature 115° C., reaction time thirty-five minutes]

| Example | pco atm. | $R = \frac{H_2}{CO}$ | Conversion, percent |
|---|---|---|---|
| 1 | 20 | 5 | 65 |
| 2 | 105 | 0.5 | 14.4 |

*Table 1b*

[Olefine: cyclohexene; temperature 110° C, reaction time sixty-eight minutes]

| Example | pco atm. | $R = \frac{H_2}{CO}$ | Conversion, percent | Yield, percent |
|---|---|---|---|---|
| 3 | 10 | 5.5 | 49 | 80 |
| 4 | 110 | 1 | 17.4 | 63 |
| 5 | 55 | 1 | 18.1 | 64 |
| 6 | 55 | 2 | 33.4 | 74 |
| 7 | 10 | 2.6 | 39 | 69 |
| 8 | 2-3 | 37-55 | 45.0 | 76 |
| 9 | 10 | 11 | 63 | 76 |

*Table 2*

[Olefine: 2-ethyl-hexene-1; temperature 110° C., reaction time sixty-eight minutes]

| Example | pco atm. | $R = \frac{H_2}{CO}$ | Conversion, percent |
|---|---|---|---|
| 10 | 10 | 5.5 | 25.2 |
| 11 | 10 | 11 | 33 |
| 12 | 55 | 1 | 15.7 |

*Table 3a*

[Olefine: propylene; total pressure 220 atm., temperature 82° C., reaction time one hundred eithty minutes]

| Example | pco atm. | $R = \frac{H_2}{CO}$ | Conversion, percent |
|---|---|---|---|
| 13 | 10 | 20 | 74 |
| 14 | 150 | 1 | 21.6 |

*Table 3a*

[Olefine: propylene; temperature 74° C., reaction time one hundred fifty minutes]

| Example | Temperature, ° C. | pco atm. | $R = \frac{H_2}{CO}$ | Conversion, percent | Yield, percent |
|---|---|---|---|---|---|
| 15 | 74.5 | 7 | 4.5 | 26.2 | 73.5 |
| 16 | 73.5 | 2-3 | 14 | 15 | 81.8 |
| 17 | 75 | 54 | 2 | 12 | 75 |

We claim:
1. A process for producing an aldehyde, comprising reacting an olefine hydrocarbon, dissolved in an organic solvent, in a homogeneous phase system, with hydrogen and carbon monoxide, at temperatures ranging from 50 to 130° C., in the presence of dicobalt octacarbonyl, the molar ratio between the hydrogen and carbon monoxide being selected in the range from about 5:1 to 50:1, the partial pressure of carbon monoxide being from 5 to 35 atmospheres, the total pressure employed in the process being based upon the partial pressure of carbon monoxide and on the value selected for said molar ratio, the total pressure being not above about 222 atmospheres.

2. The process of claim 1, the olefine hydrocarbon having three to eight carbon atoms.

3. The process of claim 1, the olefine hydrocarbon being taken from the group consisting of propylene, 2-ethyl-hexene-1, and cyclohexene.

4. The process of claim 1, the solvent being taken from the group consisting of liquid paraffin hydrocarbons and aromatic hydrocarbons.

5. The process according to claim 1, wherein, for an operating temperature of about 110° C., the carbon monoxide partial pressure is adjusted to between 7 and 10 atmospheres; for an operating temperature from 110 to 130° C. the carbon monoxide partial pressure is adjusted to between 10 and 35 atmospheres; and for an operating temperature from room temperature to 110° C. the carbon monoxide partial pressure is adjusted to between 2 and 10 atmospheres.

6. The process of producing hexahydrobenzaldehyde from cyclohexene, which comprises charging a shaking autoclave with an n-heptane solution of cyclohexene, a catalytic amount of dicobalt octacarbonyl, a carbon monoxide-hydrogen mixture at 120 atmospheres pressure whereof the carbon monoxide partial pressure is 20 atmospheres, shaking and heating for thirty-five minutes to about 115° C., cooling and recovering said aldehyde from the liquid portion of the reaction mixture.

7. The process of producing hexahydrobenzaldehyde from cyclohexene, which comprises charging a shaking autoclave with a toluene solution of cyclohexene, a catalytic amount of dicobalt octacarbonyl and hydrogen at 45 atmospheres pressure, heating to 110° C., introducing a 1:1 mixture of carbon monoxide-hydrogen to increase the pressure to 65 atmospheres, maintaining this pressure while heating to 110° C. for about sixty-eight minutes by continuously adding of said 1:1 mixture, cooling and recovering aldehyde from the liquid portion of the reaction mixture.

8. The process of producing $C_9$ aldehydes from 2-ethyl-hexene-1, which comprises charging a shaking autoclave with a toluene solution of 2-ethyl-hexene-1, a catalytic amount of dicobalt octacarbonyl and a carbon monoxide-hydrogen mixture at 120 atmospheres whereof the carbon monoxide partial pressure is 10 atmospheres, heating for sixty-eight minutes to 110° C. while keeping the pressure constant by continuously feeding of said mixture, cooling and recovering said aldehydes from the liquid portion of the reaction mixture.

9. The process of producing butyric aldehydes from propylene, which comprises charging a shaking autoclave with a benzene solution of propylene, a catalytic amount of dicobalt octacarbonyl and hydrogen at 170 atmospheres pressure, heating to 82° C., introducing a 1:1 mixture of carbon monoxide-hydrogen to increase the pressure to about 220 atmospheres, maintaining this pressure for about three hours while heating to 82° C. by continuously adding of said 1:1 mixture, cooling and recovering said aldehydes from the liquid portion of the reaction mixture.

References Cited in the file of this patent

UNITED STATES PATENTS 2,437,600     Gresham et al.     Mar. 9, 1948

FOREIGN PATENTS 633,184     Great Britain     Dec. 12, 1949